March 12, 1935.  R. S. MUELLER  1,994,251
CONNECTER
Filed March 2, 1934
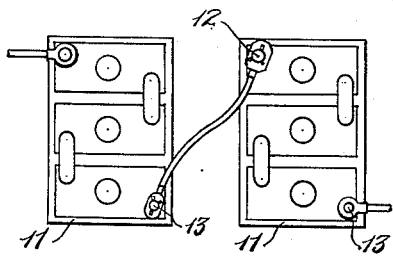
FIG.1
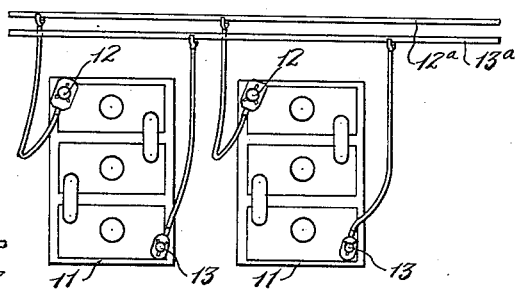
FIG.1-A
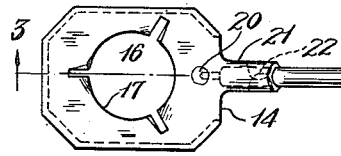
FIG.2
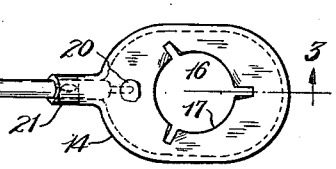
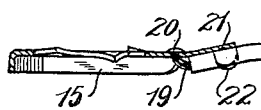
FIG.3
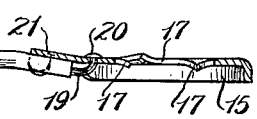
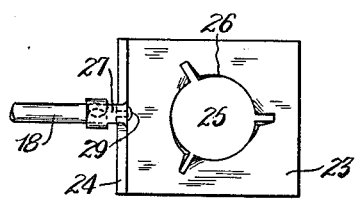
FIG.4
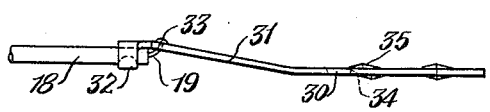
FIG.6
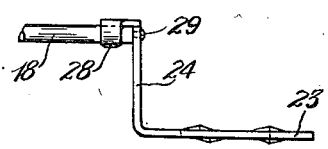
FIG.5
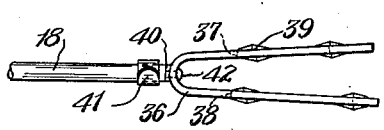
FIG.7
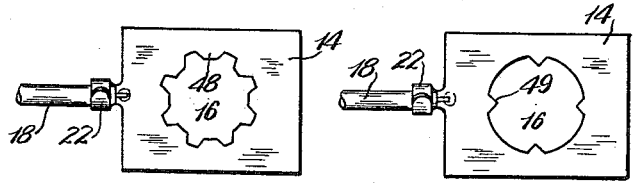
FIG.9    FIG.10
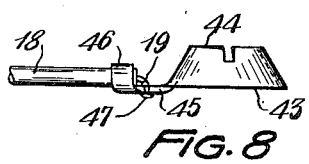
FIG.8
INVENTOR:
RALPH S. MUELLER
Kwis Hudson & Kent
ATTORNEYS

UNITED STATES PATENT OFFICE 1,994,251

CONNECTER

Ralph S. Mueller, Cleveland, Ohio, assignor to Mueller Electric Company, a partnership composed of Ralph S. Mueller, Maude K. Mueller, Virginia de Coningh, and Scott Mueller Application March 2, 1934, Serial No. 713,703

1 Claim. (Cl. 173—259)

This invention relates to an electrical connecter particularly adapted for connecting storage batteries for series charging, constant potential charging, or for other purposes.

There are two types of electrical connecters now in general use for connecting storage batteries for charging and for other purposes, namely, the clip connecter and the spike connecter.

The clip connecter comprises a conductor to the opposite ends of which are secured clips formed of movable jaws held in closed position by means of strong springs. The clip connecters are relatively expensive in their initial cost and the length of their useful life is dependent upon the springs retaining their strength. The clip connecters must be carefully applied to the posts of a battery if they are to be firmly and securely connected therewith.

The spike connecter comprises a conductor having at one or both of its ends metallic bodies through which extend headed spikes that are similar to ordinary nails. The spike connecter is secured to the posts of the storage batteries by driving the spikes directly into the posts. Although spike connecters are relatively less expensive initially than the clip connecters, their life ordinarily is not as long. Carelessness in driving the spikes into the battery posts often results in the metallic body carrying the spike being hit instead of the spike head, thereby loosening the body in its securement on the spike and causing a poor electrical connection between it and the spike. The spike connecters are suitable for use only on solid battery posts and could not be effectively used on posts that are otherwise constructed.

An object of the present invention is to provide an electrical connecter of the character specified which is simple in construction, inexpensive to manufacture and use, and which may be easily and effectively applied to all types of battery posts.

Another object is to provide an electrical connecter which may be readily secured to a battery post to make a good electrical connection therewith, even though the post is badly corroded.

Another object is to provide an electrical connecter wherein the post engaging members of the connecter will dig into the post and make a firm contact in the fresh lead thereof, which contact will not be destroyed by the member jarring loose or becoming accidentally dislodged.

A further object is to provide an electrical connecter having on the post engaging members thereof means forming convenient handling portions to facilitate its application to and its removal from the battery posts.

A still further object is to provide an electrical connecter wherein the conductor is secured to the battery post engaging member in such manner as to relieve the soldered connection, between the member and the conductor, of substantially all strains.

Further and additional objects and advantages inherent in the present invention will become apparent hereinafter as several embodiments of the invention are described in detail.

The invention contemplates an electrical connecter comprising a conductor having battery post engaging members secured to one or both of its ends in electrical contact therewith, which members may be formed of sheet metal stampings having openings therein through which the posts may extend and being provided with means which bite into the posts when the members are given a slight turning movement thereon, or, in other instances, bite into the posts merely through the application of the members to the posts. The members are also so formed as to be provided with reenforcing portions and with portions which may be used as manipulating or finger engaging parts to facilitate the application of the members to the posts.

The conductor is preferably connected to the members by a soldered connection, while the members are provided with means cooperating with the conductor inwardly of its ends to relieve the soldered connection of any strain.

Referring to the accompanying drawing:

Figure 1 is a top plan view of two storage batteries connected for series charging by means of connecters constructed according to the present invention;

Fig. 1a is a similar view showing the batteries connected for constant potential charging;

Fig. 2 is a plan view of one embodiment of the invention;

Fig. 3 is a sectional view taken substantially on line 3—3 of Fig. 2, looking in the direction of the arrows;

Fig. 4 is a fragmentary plan view of a different form or embodiment of the invention from that illustrated in Figs. 2 and 3;

Fig. 5 is a fragmentary side elevational view of the connecter shown in Fig. 4;

Fig. 6 is a fragmentary side elevational view of a different form of the invention from those shown in any of the preceding views;

Fig. 7 is a fragmentary side elevational view of another and different form of the invention from any of those shown previously;

Fig. 8 is a fragmentary side elevational view of a still different embodiment of the invention;

Fig. 9 is a fragmentary plan view of another embodiment of the invention from those already shown; and Fig. 10 illustrates a further and additional embodiment of the invention.

As already stated, the connecter of the present invention is susceptible of particular utility in electrically connecting a number of storage batteries for either series charging or constant potential charging. Fig. 1 shows in top plan a pair of storage batteries 11 having their positive posts 12 connected to the negative posts 13 of the adjacent battery by means of connecters embodying the present invention. Fig. 1a shows in top plan a pair of storage batteries which have their posts 12 connected to a bus bar 12a and their posts 13 connected to a bus bar 13a by means of connecters embodying the invention for constant potential charging.

In all forms or embodiments of the invention it is contemplated to blank and stamp the post engaging members of the connecters from sheet metal and then to make them acid resisting by lead coating the members by either a simple lead dipping operation or, if desired, by an electrolysis treatment. In this way the cost of manufacture will be relatively low, since there will be substantially no waste of material inasmuch as the post engaging members are of regular shape, while the blanking and stamping and lead coating operations are simple ones and do not require expensive dies or apparatus for their performance.

In the form of the invention shown in Figs. 2 and 3, the post engaging members 14 are, as already stated, blanked and stamped from sheet metal and then lead coated. These members are provided with peripheral strengthening flanges 15 and centrally disposed openings 16, interrupted threads 17 being formed on the members at the circumference of the openings 16 and functioning when the openings 16 are positioned over the battery posts and the members turned thereon to bite or dig through any corrosion into the post and make a firm contact in the fresh lead thereof. The members 14 will thus be firmly secured to the post and will not jar loose or become accidentally dislodged. A slight twist in the opposite direction is sufficient to enable the removal of the members from the post.

The openings 16 of the post engaging members of each connecter will be of different sizes, inasmuch as the positive post of a battery is usually larger than the negative post thereof. In order to facilitate the application of the connecter it is desirable to make the post engaging members of each connecter of different shape according to the post upon which they are to be positioned. As illustrative of this feature, it will be noted in Fig. 2 that the left-hand member 14 is provided with the larger opening 16 and is octagonal in shape, while the right-hand member 14 has a smaller opening 16 and is oval shaped, the former member being for the positive post and the latter member for the negative post.

The conductor 18 extends between the post engaging members 14 and has at each end exposed portions of its copper wire 19 which extend through openings in the members 14 from the underside of the members to the top side thereof where the ends of the portions are electrically joined to the members preferably by a soldered connection 20. In order to relieve the soldered connection 20 of any strain and to provide manipulating handles for the members 14, said members have portions 21 extending from their rear ends toward each other and provided at the ends of the portions with oppositely disposed ears 22 which are bent toward each other and around the conductor to firmly engage the same and to thereby relieve the connection 20 of any strain imparted to the conductor.

In the form of the invention shown in Figs. 4 and 5 the post engaging members are in the nature of sheet metal angles comprising a portion 23 and a portion 24 arranged substantially at right angles thereto. It will be understood that the post engaging members of each connecter in this form of the invention may be of different shape according to whether they are to be used on the positve or negative posts and that the post engaging member shown in Figs. 4 and 5 on one end of the conductor 18 differs slightly in shape from the member which would be on the opposite end of the conductor.

The portion 23 of the member is provided with a post engaging opening 25 and with an interrupted thread 26 at the circumference of said opening. The upper end of the portion 24, intermediate the side edges thereof, is provided with a rearwardly or laterally extending tab 27 having at its outer end oppositely disposed ears 28. The bared portion 19 of the copper wire of the conductor extends through an opening in the portion 24 and has its end electrically connected to the inner side of the portion by a soldered connection 29. The ears 28 are bent into tight holding engagement with the conductor 18 to thus relieve the soldered connection 29 of any strain. The portion 24 of the post engaging mmebers may be used as the manipulating handle for applying the members to the battery posts in the same manner as the members 14 are applied to the post by the portions 21, as previously described.

In Fig. 6 the post engaging member 30 is provided with a rearwardly and angularly disposed portion 31 serving as a handle, such portion having at its rear end a reduced extension provided with oppositely disposed ears 32 which are clinched around the conductor 18 and thus relieve the soldered connection 33, between the copper wire 19 of the conductor and the portion 31 of the member 30, of any strain.

The member 30, as in the previous forms, is provided with a post engaging opening 34 and with an interrupted thread 35 at the circumference of said opening. The post engaging member shown in Fig. 6 is applied to a battery post in the same manner as the post engaging members previously described herein.

In Fig. 7 the post engaging member 36 is formed substantially U-shaped and is provided in its arms with post engaging openings 37 and 38, the former opening being at the top and smaller than the lower and larger opening 38. The arms of the member 36 are also provided with an interrupted thread 39 surrounding the openings 37 and 38 and similar to the interrupted thread 17 in the embodiment shown in Figs. 2 and 3.

The base of the member 36, that is the bent portion thereof, is provided on one edge with a rearwardly extending tab 40 having at its outer end ears 41, similar to the ears 22 already referred to in connection with the form shown in Fig. 2. The conductor 18 extends between the ears which are clamped thereon to tightly hold the same and has its bared copper wire portion passing through an opening in the base of the opening 36 and united to the inner side of the member by a soldered connection 42.

The post engaging member shown in this form of the invention is applied to the battery post by passing the post through the openings 37 and 38 and then giving the member a partial turn, as heretofore described, using the tab or the base portion of the member as the manipulating handle.

Since battery posts are constructed ordinarily with an upwardly diminishing taper, the purpose of having the openings 37 and 38 of different diameter will readily be apparent, and it will be noted that a post engaging member of this character forms a double grip upon the post and a double contact therewith.

The post engaging member 43, shown in Fig. 8, is in the form of a truncated cone having a tapered opening therethrough and provided at its upper end with an interrupted thread 44 surrounding said opening. As previously stated most battery posts are formed with an upwardly diminishing taper and, therefore, when the member 43 is positioned upon the post, the tapered opening therethrough will interfit the post and a slight rotary movement of the member will cause the interrupted thread 44 to bite into the lead of the post.

The member 43 at its rear bottom edge is provided with a rearward extension 45 having at its end ears 46 which are clinched around the conductor 18, while the copper wire 19 of the conductor extends through an opening in the extension 45 and is connected to the under side thereof by a soldered connection 47. The extension 45 may be used as a manipulating handle in applying the member 43 to a battery post.

The forms of the invention shown in Figs. 9 and 10 differ from that shown in Figs. 2 and 3, in that other means than the interrupted thread 17 is provided for biting into the battery post. In Fig. 9 the opening 16 has its circumference formed with gear teeth 48 which will cut through the corrosion and bite into the battery post when the member is rotated as it is applied thereto. In Fig. 10 the circumference of the opening 16 in the member is provided with a plurality of inwardly extending sharp teeth 49 which serve the same purpose as the gear teeth 48 in the form disclosed in Fig. 9.

Ordinarily when connecters embodying the present invention are used to connect the batteries for constant potential charging the conductor will have a post engaging member secured to one of its ends only since its opposite end is connected to a bus bar.

Although several embodiments of the invention have been illustrated and described herein, it should be understood that the invention is susceptible of various modifications and adaptations within the scope of the appended claim.

Having thus described my invention, I claim:

A battery post connecter comprising a conductor having a post engaging member secured to one of its ends, said member being a sheet metal stamping and including a substantially flat portion provided substantially throughout its periphery with a reenforcing flange and having an opening formed therein and completely surrounded by the metal of the member and of such size and shape as to snugly fit but be rotatable on the battery post, said member being provided at the circumference of the opening with an interrupted thread for biting radially into the material of the post when the member is rotated thereon.

RALPH S. MUELLER.